(12) United States Patent
VanDerKamp et al.

(10) Patent No.: US 8,462,019 B1
(45) Date of Patent: Jun. 11, 2013

(54) POSITION-DEPENDENT SYSTEM, APPARATUS, AND METHOD FOR GENERATING RUNWAY VISUAL AIDS PRESENTED ON AN AIRCRAFT DISPLAY UNIT

(75) Inventors: Travis S. VanDerKamp, Marion, IA (US); Tiffany D. Williamson, Cedar Rapids, IA (US); Daniel Y. Chiew, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 349 days.

(21) Appl. No.: 12/884,545

(22) Filed: Sep. 17, 2010

(51) Int. Cl.
*G01C 21/00* (2006.01)

(52) U.S. Cl.
USPC ............. 340/972; 340/995.16; 340/426.22; 340/539.2

(58) Field of Classification Search
USPC ............. 340/972–985, 990, 995.1, 995.16, 340/995.26–995.27, 426.22, 539.28, 539.2
See application file for complete search history.

(56) References Cited

U.S. PATENT DOCUMENTS

| | | | |
|---|---|---|---|
| 6,163,309 A * | 12/2000 | Weinert | 345/7 |
| 6,438,469 B1 * | 8/2002 | Dwyer et al. | 701/16 |
| 6,920,390 B2 * | 7/2005 | Mallet et al. | 701/120 |
| 7,555,372 B2 * | 6/2009 | Dwyer | 701/16 |
| 7,592,929 B2 * | 9/2009 | Pepitone | 340/945 |
| 7,605,719 B1 | 10/2009 | Wenger et al. | |
| 2010/0250030 A1 * | 9/2010 | Nichols et al. | 701/7 |
| 2011/0095913 A1 * | 4/2011 | Painter et al. | 340/972 |

OTHER PUBLICATIONS

U.S. Appl. No. 11/820,950, filed Mar. 31, 2006, Krenz et al (Not published).
U.S. Appl. No. 12/217,458, filed Jul. 3, 2008, Chiew et al (Not published).
U.S. Appl. No. 12/462,719, filed Oct. 20, 2009, Wenger et al (Not published).

* cited by examiner

*Primary Examiner* — Daniel Previl
(74) *Attorney, Agent, or Firm* — Donna P. Suchy; Daniel M. Barbieri

(57) ABSTRACT

A present novel and non-trivial system, apparatus, and method for generating runway visual aids on an aircraft display unit, where such visual aids could be comprised of surface markings corresponding to the runway. Navigation data and runway data may be provided to an image generating processor which, in turn, generates an image data set representative of at least one visual aid corresponding to one runway located in the scene outside the aircraft. The intensity or brightness of a visual aid could vary when the aircraft is operating on the approach phase of flight. The variation of such intensity could be defined as a function of the navigation data and the data representative of one or more waypoints. The image data set may be provided to a Head-Down Display unit, a Head-Up Display unit, or both, each visual aid is presented on the screen of the display unit.

23 Claims, 9 Drawing Sheets

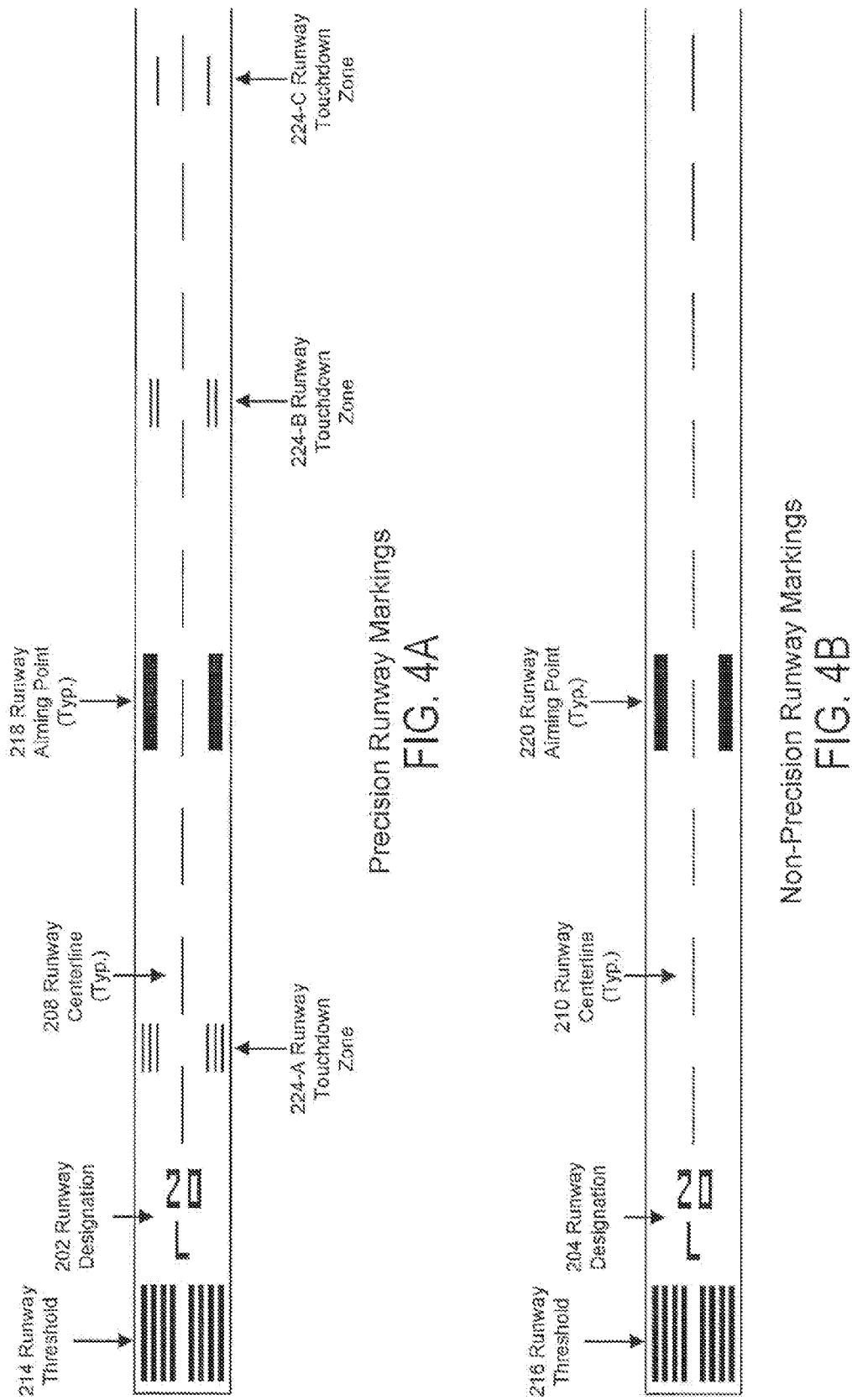

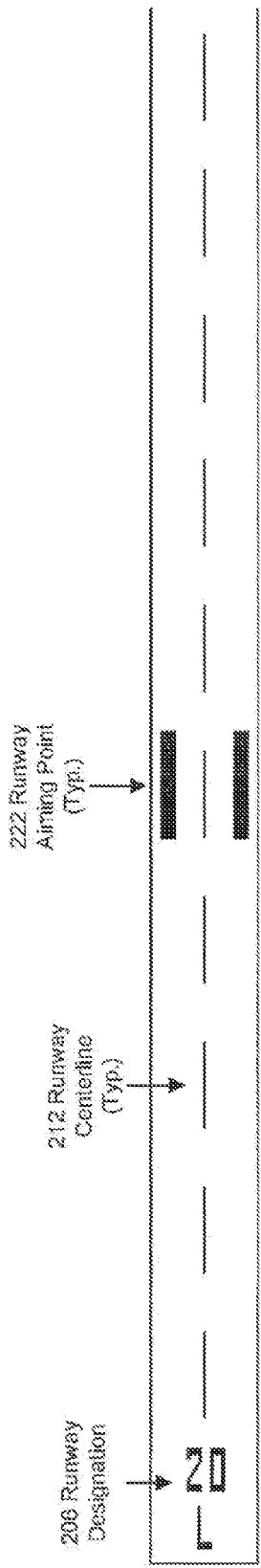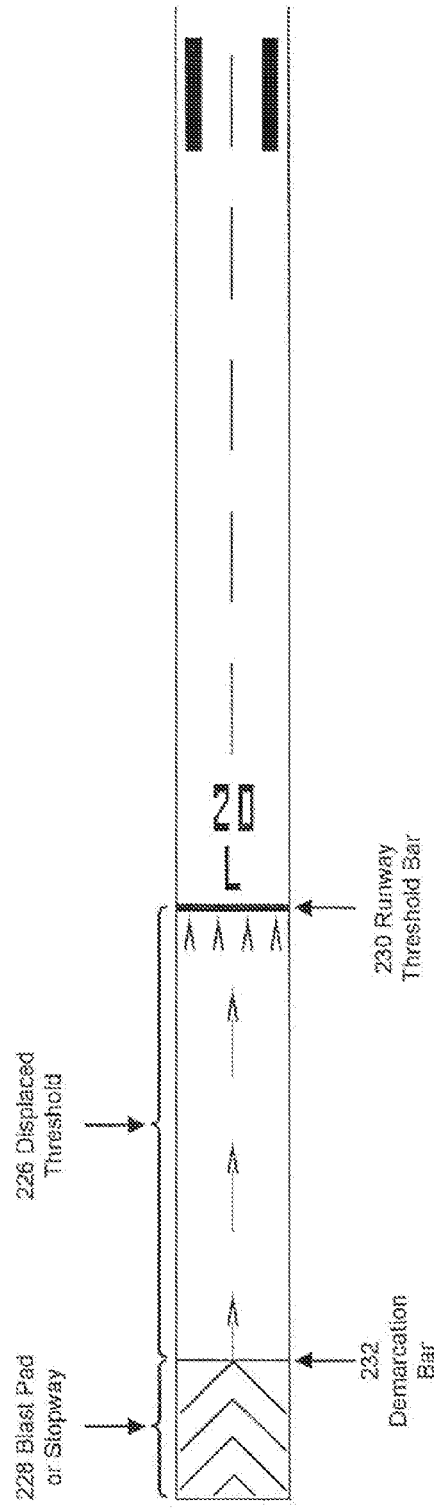

POSITION-DEPENDENT SYSTEM, APPARATUS, AND METHOD FOR GENERATING RUNWAY VISUAL AIDS PRESENTED ON AN AIRCRAFT DISPLAY UNIT

BACKGROUND OF THE INVENTION

1. Field of the Invention

This invention pertains generally to the field of cockpit indicators or display units that provide flight information of a runway environment to the pilot or flight crew of an aircraft, and more particularly to synthetic vision systems (SVS), enhanced vision systems (EVS), or combined SVS-EVS.

2. Description of the Related Art

The display of information on a Head-Up Display ("HUD") unit is a tradeoff between providing valuable information to the pilot and obscuring the pilot's view of the scene outside the aircraft. One area of major concern is the pilot's view when the pilot is flying an approach procedure to the runway for landing. The runway surface and runway lights in the real world scene need to be clear and not obscured.

As discussed by Chiew et al in U.S. patent application Ser. No. 12/217,458 entitled "System, Apparatus, and Method for Generating Runway Visual Aids on an Aircraft Display Unit," a traditional display of a runway on a Head-Down Display ("HDD") unit as generated in an SVS is shown as a solid surface with runway-related marking markings. Data representative of airport surfaces and airport visual aids may be obtained from a runway database. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

Runway related-markings increase the pilot's situational awareness of the runway environment, especially when the airport is not nearby. Although these markings may provide a benefit, they may become a detriment as the aircraft approaches the runway and the pilot lands on the runway. Such markings may produce a source of clutter and/or pilot frustration when they are presented with a constant intensity and/or brightness while the pilot has the actual runway in sight in the scene outside the aircraft.

BRIEF SUMMARY OF THE INVENTION

The embodiments disclosed herein present at least one novel and non-trivial system, apparatus, and method for generating runway visual aids on an aircraft display unit, where the intensity of at least one visual aid varies when the aircraft is operating in an approach phase of flight.

In one embodiment, a system is disclosed for generating runway visual aids presented on an aircraft display unit. The system could be comprised of a source for navigation data, a source of reference data, an image generating processor, and at least one aircraft display unit. In an additional embodiment, the system comprises a source for weather data, a user interface for providing intensity configuration data, and/or a source of vision image data. The image generating processor could generate an image data set based upon the navigation data and the reference data, where the image data set is representative of at least one visual aid corresponding to one runway located in the scene outside the aircraft. In one embodiment, a visual aid could be comprised of surface markings corresponding to the runway. In another embodiment, the intensity or brightness of at least one visual aid may vary when the aircraft is operating in an approach phase of flight. In another embodiment, the variation of intensity may be defined as a function of the location of the aircraft and the location of at least one waypoint, the altitude of the aircraft and the elevation of at least one waypoint, or both.

After the image data set has been generated, the image generating processor could provide the image data set to one or more display units for presenting each visual aid represented in the image data set, whereby each visual aid is presented on the screen of the display unit and the intensity of at least one visual aid varies as the aircraft operates in the approach phase of flight. As embodied herein, the display unit could be comprised of a HUD unit and/or an HDD unit.

In another embodiment, an apparatus is disclosed for generating runway visual aids presented on an aircraft display unit. The apparatus could be comprised of an input communications interface, an image generating processor, and an output communications interface. The input communications interface may facilitate the receipt of data from one or more data sources, and the output interface may facilitate the providing of the image data set to one or more display units. After receiving navigation data and reference data through the input communication interface, the image generating processor could generate an image data set, where the image data set is representative of at least one visual aid corresponding to one runway located in the scene outside the aircraft. After generating the image data set, the image generating processor could provide the image data set to one or more display units through the output communication interface, whereby each visual aid represented in the image data set is presented on each display unit.

In another embodiment, a method is disclosed for generating runway visual aids presented on an aircraft display unit. Navigation data and reference data could be received. In an additional embodiment, weather data, intensity configuration data, and/or vision image data could be received. An image data set could be generated, where the image data set is representative of at least one visual aid corresponding to one runway located in the scene outside the aircraft. This image data set could be provided to one or more display units, whereby each visual aid may be presented on the screen of each display unit.

The drawings of FIG. 2 depict exemplary illustrations of images of terrain, a runway, and symbology presented on display units.

The drawings of FIG. 3 depict exemplary illustrations of images of terrain and a runway presented on display units without the images of symbology.

The drawings of FIG. 4 depict exemplary illustrations of runway and non-runway surface markings.

The drawings of FIG. 5 depict exemplary illustrations of runway and non-runway surface markings as depicted on a display unit.

Figure 6A:
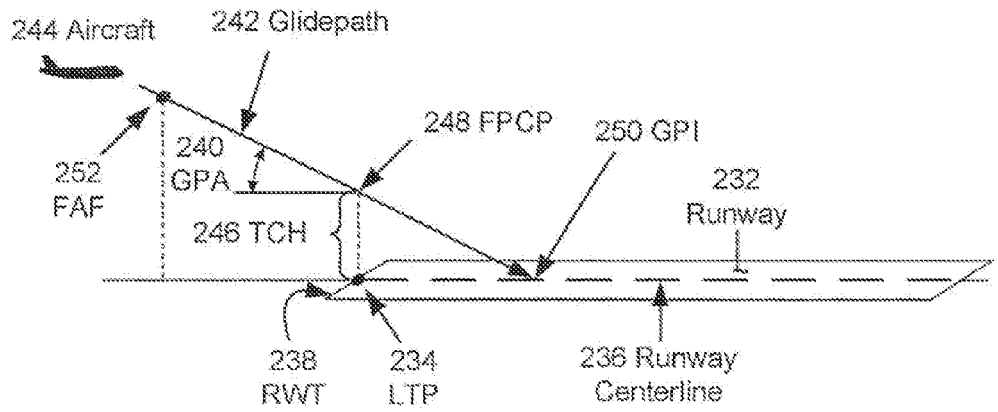
Figure 6B:
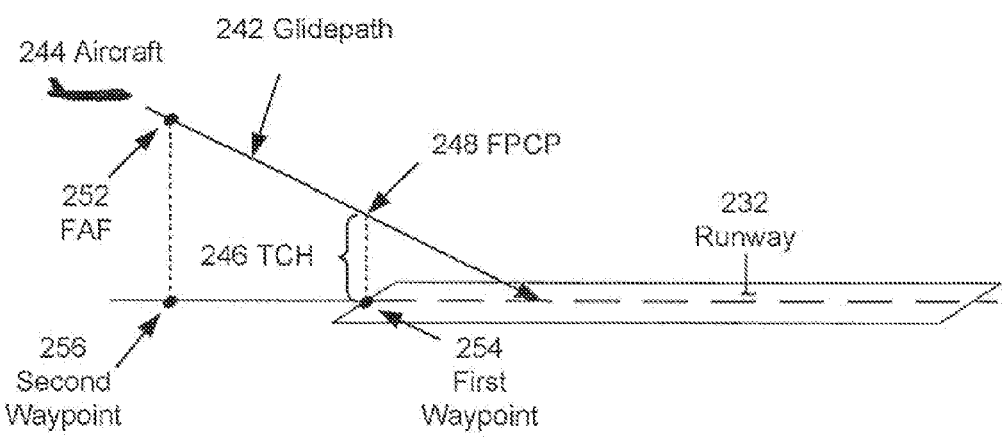
Figure 6C:
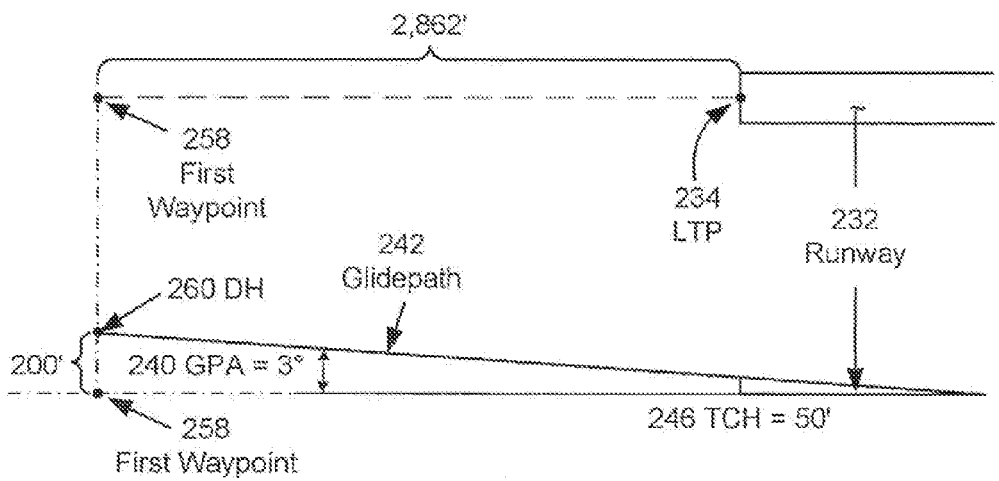
Figure 7:
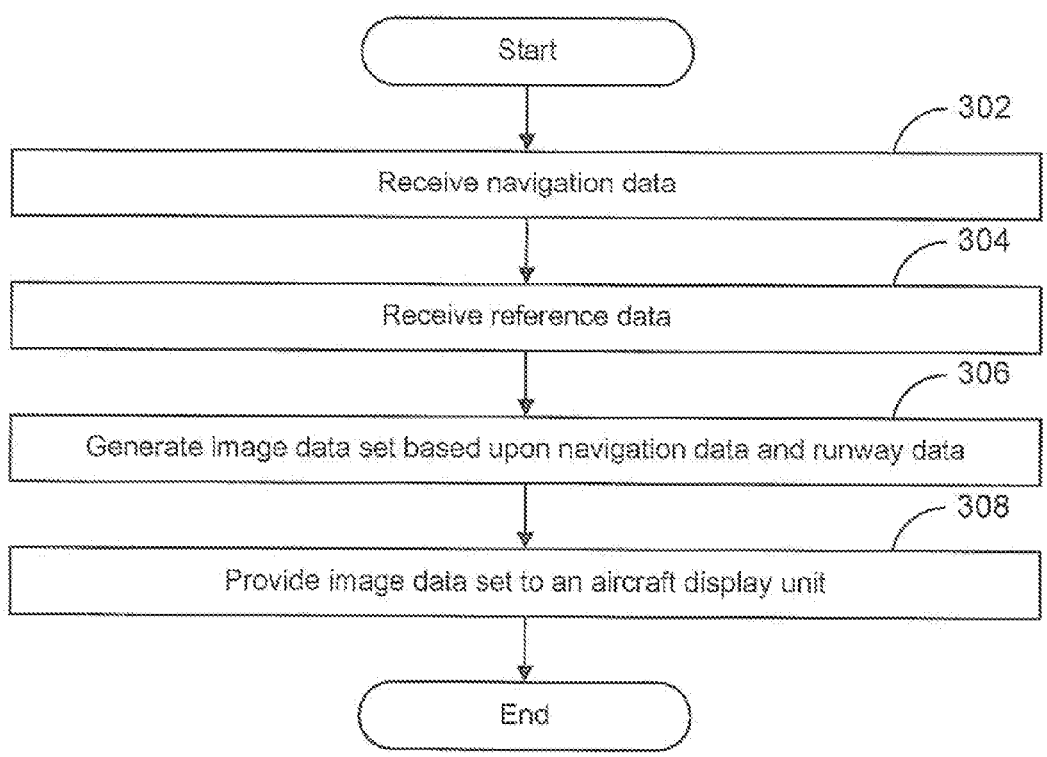

The drawings of FIG. 6 depict reference points and definitions that could be associated with a runway FIG. 7 provides a flowchart illustrating a method for generating runway visual aids.

DETAILED DESCRIPTION OF THE INVENTION

In the following description, several specific details are presented to provide a complete understanding of embodiments of the invention. One skilled in the relevant art will recognize, however, that the invention can be practiced without one or more of the specific details or in combination with other components. In other instances, well-known implementations or operations are not shown or described in detail to avoid obscuring aspects of various embodiments of the invention.

Figure 1:
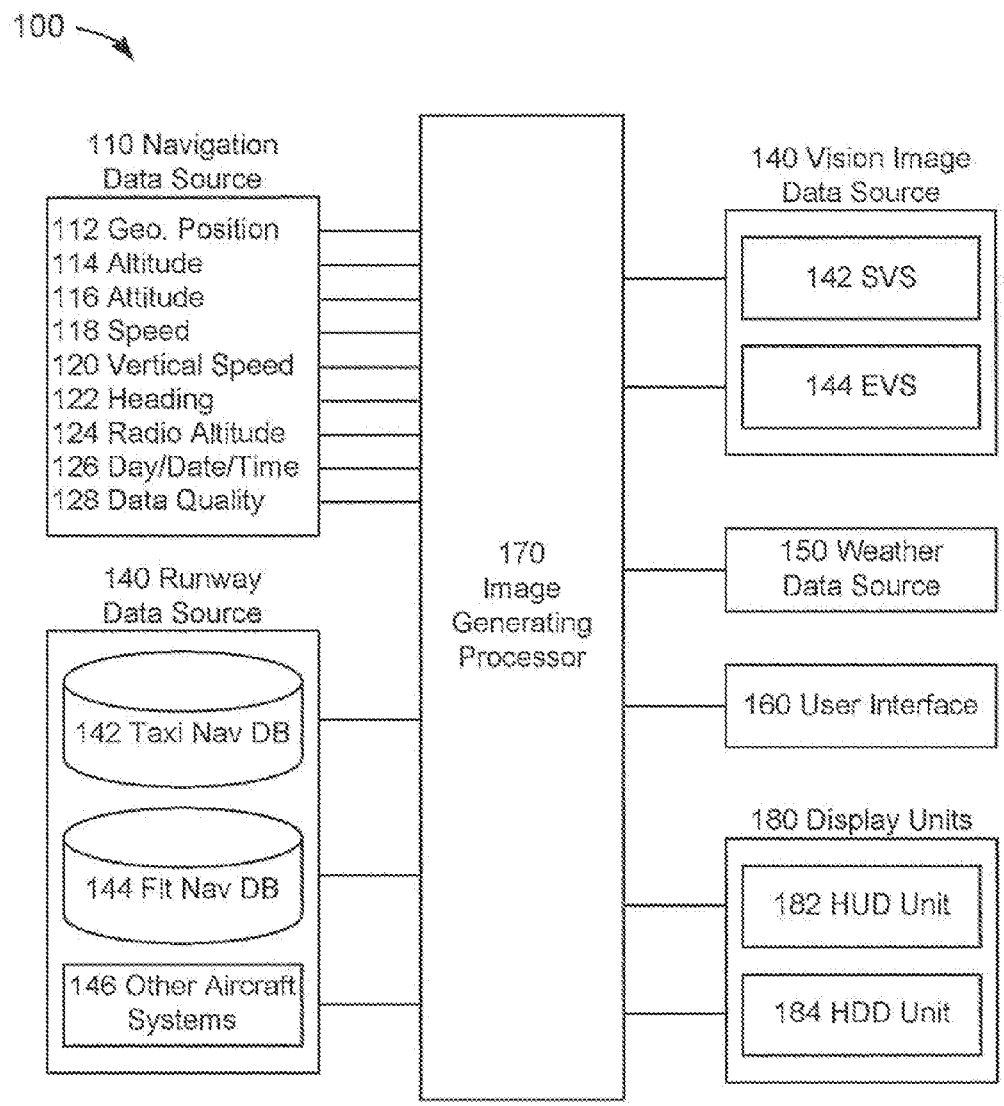
FIG. 1 depicts a block diagram of a system for generating runway visual aids.

FIG. 1 depicts a runway visual aid generation system 100 suitable for implementation of the techniques described herein. The system may be comprised of a navigation data source 110, a vision image data source 130, a reference data source 140, a weather data source 150, a user interface 160, an image generating ("IG") processor 170, and display units 180.

In an embodiment of FIG. 1, the navigation data source 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), a global navigation satellite system (or satellite navigation system), and a flight management computing system ("FMS"), all of which are known to those skilled in the art. For the purposes of the embodiments herein, a radio altimeter system may be included in the navigation data source 110; a radio altimeter system is known to those skilled in the art for determining the altitude above the surface over which the aircraft is currently operating. As embodied herein, the navigation data source 110 could provide navigation data including, but not limited to, geographic position 112, altitude 114, attitude 116, speed 118, vertical speed 120, heading 122, radio altitude 124, day/date/time 126, and data quality 128 to the IG processor 170 for subsequent processing as discussed herein.

Day/date/time 126 could be data representative of the day, date, or time, or any combination of them, and may be used, for example, for determining whether a runway is available for operation. Data quality 128 may include, but is not limited to, accuracy, uncertainty, integrity, and validity for data provided by the navigation data source 110. As embodied herein, aircraft position comprises geographic position (e.g., latitude and longitude coordinates) and altitude, and direction may be derived from either geographic position, aircraft position, or both. As embodied herein, aircraft orientation may include pitch, roll, and/or yaw information related to the attitude of the aircraft.

In an embodiment of FIG. 1, the vision data source 130 may be comprised of a system or systems that could generate image data representative a three-dimensional perspective of the scene outside the aircraft including, but not limited to, a Synthetic, Vision System ("SVS") 132 and/or Enhanced Vision System ("EVS") 134. The SVS 132 may be comprised of, in part, a terrain database and a separate processor, where the terrain database is provided to such processor for creating synthetic image data representative of a three-dimensional perspective of the scene outside the aircraft for subsequent presentation on a two-dimensional display unit. The providing of synthetic image data representative of one or more display units is discussed by Wenger et al in U.S. Pat. No. 7,605,719 entitled "System and Methods for Displaying Partial Images and Non-Overlapping, Shared-Screen Partial Images Acquired for Vision Systems" ("the Wenger reference").

The EVS 134 may be comprised of, in part, at least one infrared sensor and a separate processor. Each sensor (e.g., a camera) may be mounted on the aircraft for detecting infrared radiation and/or non-visible, near-infrared radiation emanating from the scene in front of the aircraft, and the separate processor may receive sensor data to create enhanced image data representative of a three-dimensional perspective of the scene outside the aircraft for subsequent presentation on a two-dimensional display unit. The providing of enhanced image data to one or more display units is discussed in the Wenger reference.

As embodied herein, the vision data source 130 could also be comprised of a combined SVS-EVS system as disclosed in the Wenger reference which combines synthetic image data with enhanced image data to form combined synthetic-enhanced image data. As embodied herein, the vision data source 130 comprised of the SVS 132, the EVS 134, and/or the combined SVS-EVS could provide synthetic image data, enhanced image data, and/or synthetic-enhanced image data, respectively, to the IG processor 170 for subsequent processing as discussed herein.

In an embodiment of FIG. 1, the reference data source 140 could comprise any source of runway data including, but not limited to, data representative of locations and/or delimitations of markings. The reference data source 140 may include, but is not limited to, a taxi navigation database 142, a flight navigation database 144, and other aircraft systems 146. It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary runway closure could be stored in the flight navigation database 144. Any database used in the embodiments disclosed herein may be a stand-alone database or a combination of databases.

The taxi navigation database 142, such as one described by Krenz et al in U.S. Pat. No. 7,974,773, may be used to store airport data that may be representative of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

The taxi navigation database 142 could comprise an aerodrome mapping database ("AMDB") as described in the following document published by RTCA, Incorporated: RICA DO-272A entitled "User Requirements for Aerodrome Mapping Information." DO-272A provides for aerodrome surface mapping requirements for aeronautical uses particularly on-board aircraft. Those skilled in the art appreciate that these standards may be changed with future amendments or revisions, that additional content may be incorporated in future revisions, and/or that other standards related to the subject matter may be adopted. The embodiments disclosed herein are flexible enough to include such future changes and/or adoptions without affecting the content and/or structure of an AMDB.

The flight navigation database 144 may contain records which provide reference data such as, but not limited to, runway data, airport data, and/or approach data. The flight navigation database 144 could contain data associated with ground-based navigational aids; waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and GNSS Landing Systems. Such flight navigation database 144 could be provided by an aircraft system such as, but not limited to, an EMS, a system known to those skilled in the art. As disclosed by Chiew et al in U.S. patent application Ser. No. 12/217,458 entitled "System, Apparatus, and Method for Generating Runway Visual Aids on an Aircraft Display Unit," runway data provided by the flight navigation database 144 may be used to derive visual aid data.

Other aircraft systems 146 could comprise a source of reference data. For example, both TAWS and AAWS may utilize airport data which may contain, in part, reference data. As embodied herein, the reference data source 140 could provide reference data to the IG processor 170 for subsequent processing as discussed herein.

In an embodiment of FIG. 1, the weather data source 150 could comprise any source of weather data including, but not limited to, a datalink system and/or a user interface device 160. The datalink system includes those systems that receive data from sources external to the aircraft including, but not limited to, ground stations and satellites. Weather data transmitted through a datalink system could originate from or be provided by a plurality of weather data sources including, but not limited to, XM Satellite Radio, Inc. and Universal Weather and Aviation, Inc. Weather data that may be broadcast could include data contained in a variety of weather products such as, but not limited to, Aviation Routine Weather Report (METAR), Significant Meteorological Information (SIGMET), Airmen's Meteorological Information (AIRMET), Next-Generation Radar (NEXRAD), surface analysis weather maps, surface pressure, surface wind speed and direction, winds aloft, wind shear detection, echo tops, and freezing levels. As embodied herein, the weather data source 150 could provide weather data to the IG processor 170 for subsequent processing as discussed herein.

In an embodiment of FIG. 1, the user interface 160 could be comprised of a system and/or any panel, module, component, unit, and/or sub-system thereof which facilitates pilot ability to manually enter data and/or make selections. The user interface 160 may allow a pilot to manually enter weather information and/or select an intensity setting for an image presented on one or more display units 180. In one embodiment, the user interface 160 could be comprised of a cursor-pointing device such as, but not limited to, a mouse and/or trackball enabling the pilot to interact with a visual display unit configured with a graphical user interface ("GUI"). In another embodiment, the user interface 160 could be comprised of a display unit configured with a touch screen enabling the pilot to interact with a GUI. In another embodiment, the user interface 160 could be comprised of one or more tactile buttons and/or keys of a keyboard. In another embodiment, the user interface 160 could be comprised of a speech recognition system configured to receive pilot input manually. As embodied herein, the user interface 160 could provide data representative of weather information and/or intensity selection to the IG processor 170 for subsequent processing as discussed herein.

In an embodiment of FIG. 1, the IG processor 170 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG processor 170 may be driven by the execution of software or computer instruction code containing algorithms developed for the specific functions embodied herein. The IG processor 170 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the IG processor 170 could be a processor(s) used by or in conjunction with any other system of the aircraft including, but not limited to, the navigation data source 110, the image data source 130, the reference data source 140, the weather data source 150, the user interface 160, and the display units 180, or any combination thereof.

Additionally, the IG processor 170 could receive reference data from the reference data source 140 corresponding to the scene outside the aircraft, where the scene may be determined using navigation data received from the navigation data source 110. The IG processor 170 could determine one or more visual aids associated with the runway data and determine the position where at least one visual aid would appear on the screen of a display unit; for example, the determination of the screen position could include a scaling component to convert "world space" to "screen space." Then, an image data set could be generated, where the image data set may be representative of each visual aid. Thereafter, the image data set may be provided to the display units 180.

In an embodiment of FIG. 1, the display units 180 could include any unit that provides symbology of tactical flight information. As embodied herein, tactical flight information could be information relevant to the instant or immediate control of the aircraft, whether the aircraft is in flight or on the ground. The display units may include, but are not limited to, the HUD unit 182 and HDD unit 184. The HUD unit 182 provides tactical information to the pilot or flight crew, in the pilot's forward field of view through the windshield, eliminating transitions between head-down and head-up flying. The HUD unit 182 could display the same information found on a primary flight display ("PFD"), such as "basic T" information (i.e., airspeed, attitude, altitude, and heading). Although it may provide the same information as that of a PFD, the HUD unit 182 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The HUD unit 182 is designed to provide flexible configurations which may be tailored to the desired configuration specified by a buyer or user of the aircraft.

Figure 2A:
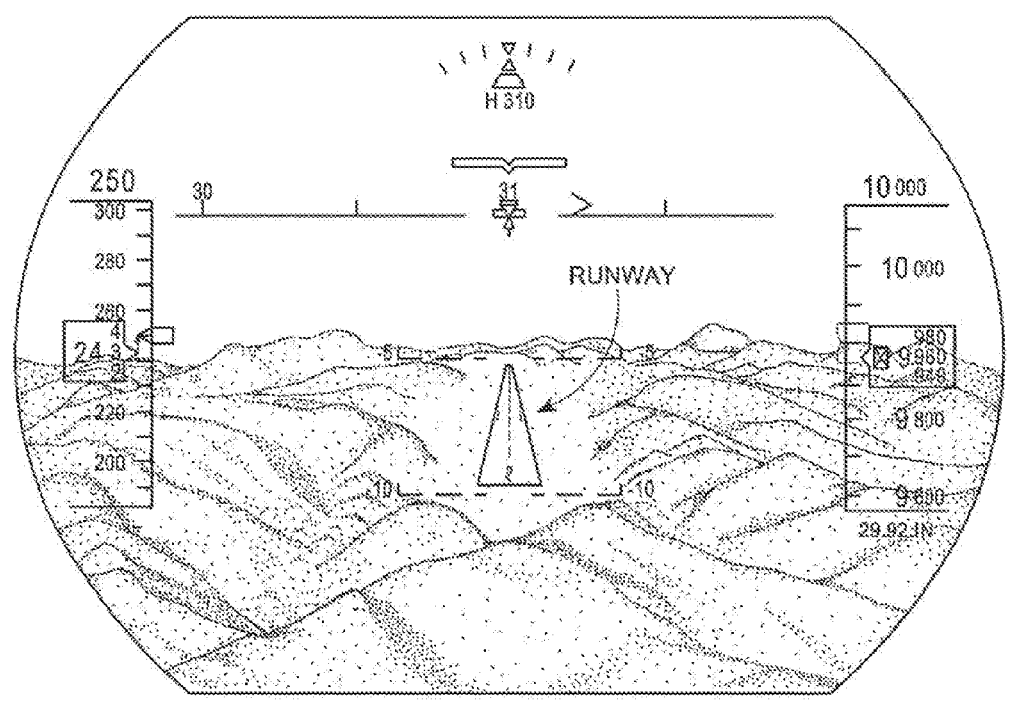

FIG. 2A provides an exemplary depiction of the HUD unit 182 for presenting tactical information to the pilot or flight crew against the background of a three-dimensional image of terrain and sky, where such image is representative of and presented against the background of the actual terrain and sky located in the scene outside the aircraft; the HUD unit 182 could be employed as a display unit in a synthetic vision system, an enhanced vision system, or combination of both. FIG. 2A provides an exemplary depiction of the HUD unit 182 presenting an image of a runway located within a three-dimensional display of terrain, which such image is representative of and presented against the background of an actual runway located in the scene outside the aircraft. It should be noted that the tactical information depicted on the HUD unit 182 has been made minimal for the sake of presentation and is not indicative of the plurality of indications or information with which it may be configured.

Returning to FIG. 1, the HDD unit 184 is typically a unit mounted to an aircraft's flight instrument panel located in front of a pilot and below the windshield and the pilot's field of vision. Similar to the HUD unit 182, the HDD unit 184 may be tailored to the desired configuration specified by a buyer or user of the aircraft.

Figure 2B:
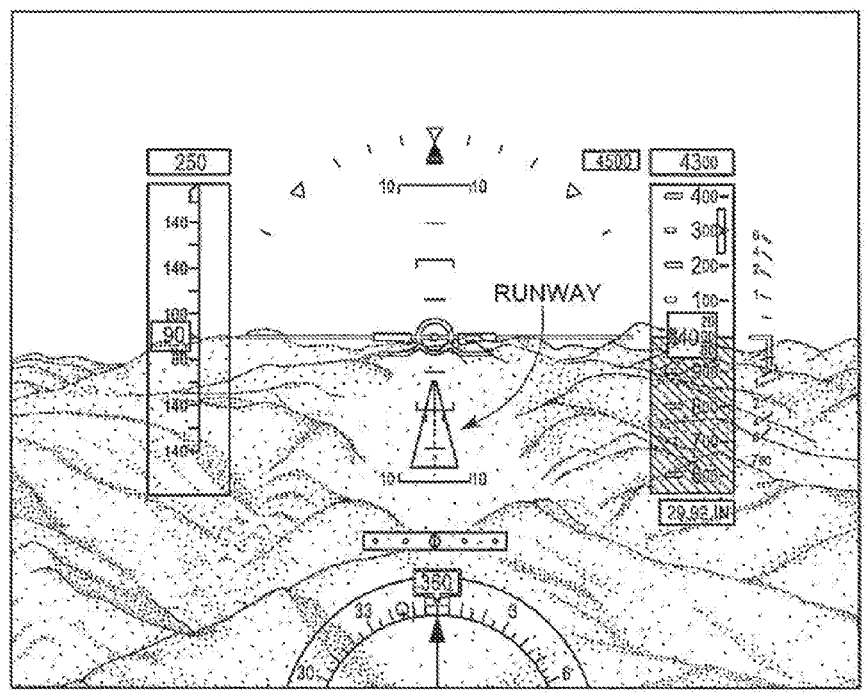

FIG. 2B provides an exemplary depiction of the HDD unit 184 for presenting tactical information to the pilot or flight crew against the background of a three-dimensional image of terrain and sky; the HDD unit 184 could be employed as a display unit in a synthetic vision system, an enhanced vision system, or combination of both. FIG. 2B provides an exemplary depiction of the HDD unit 184 presenting an image of a runway located within a three-dimensional display of terrain. It should be noted that the tactical information depicted on the HDD unit 184 and has been made minimal for the sake of presentation and is not indicative of the plurality of indications or information with which it may be configured.

Figure 3A:
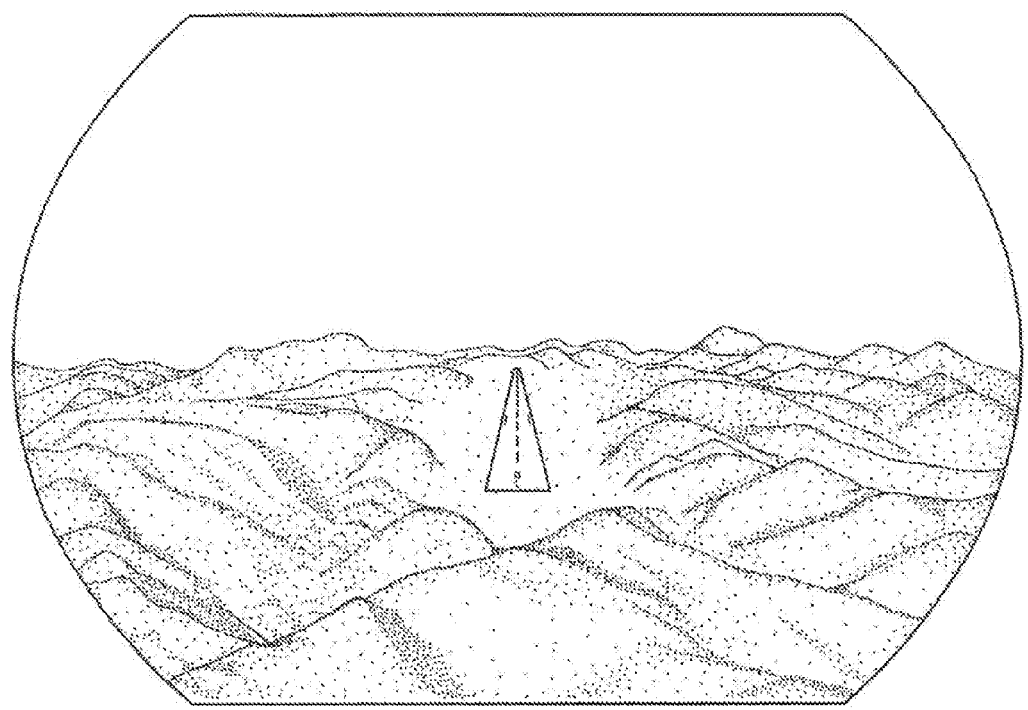
Figure 3B:
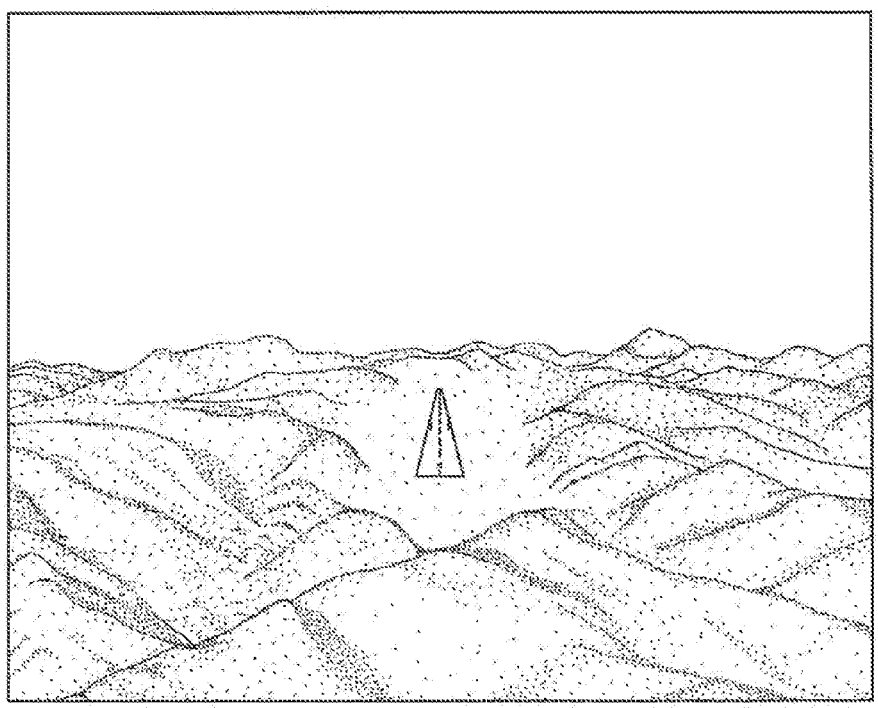
Figure 5A:
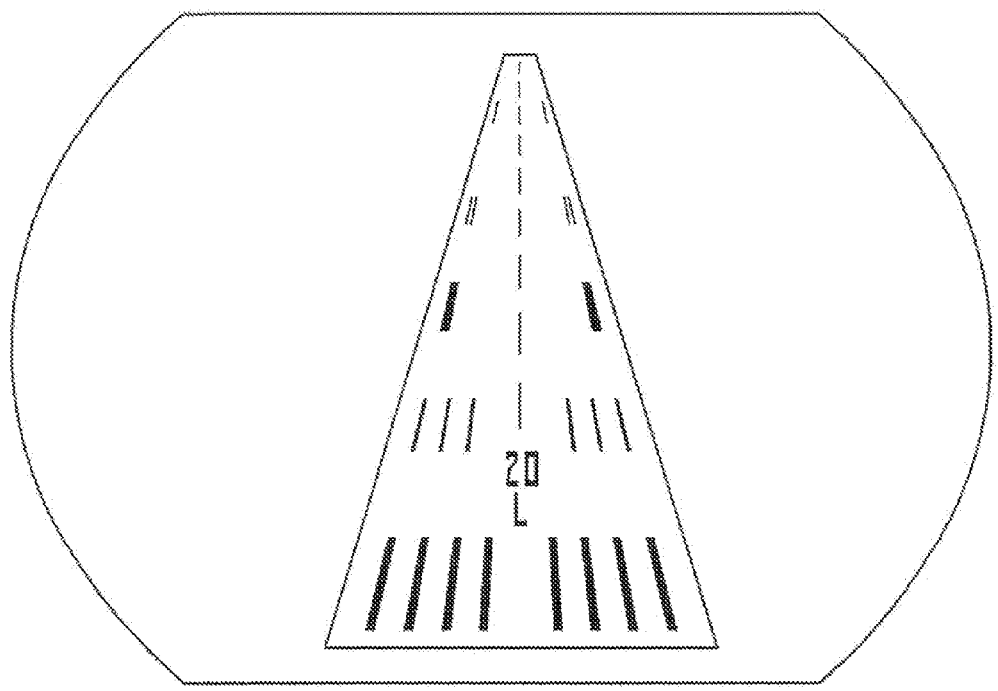
Figure 5B:
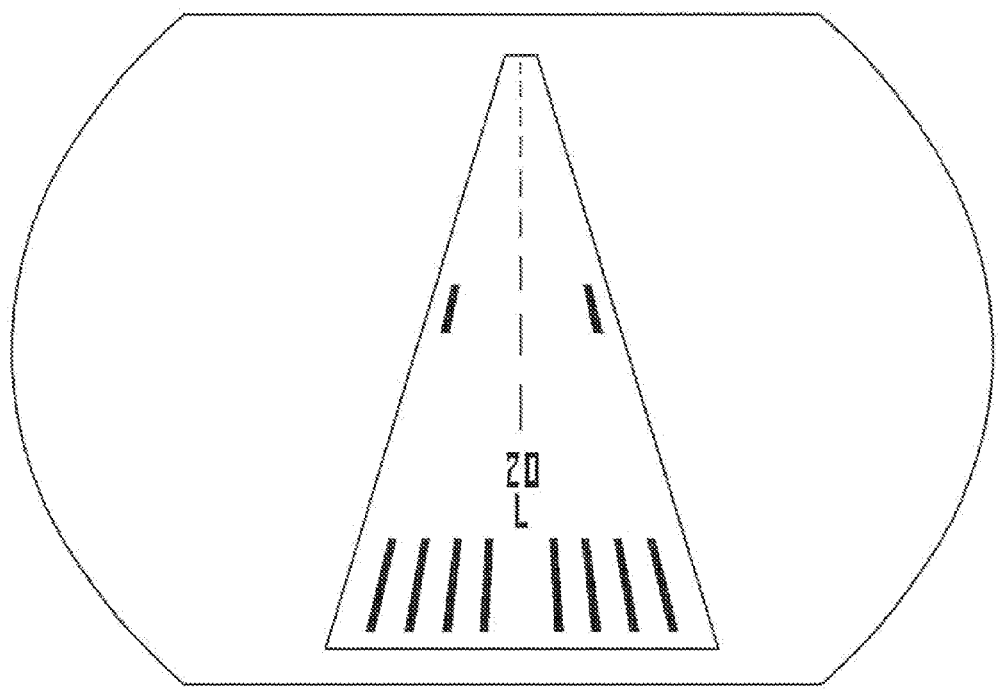
Figure 5C:
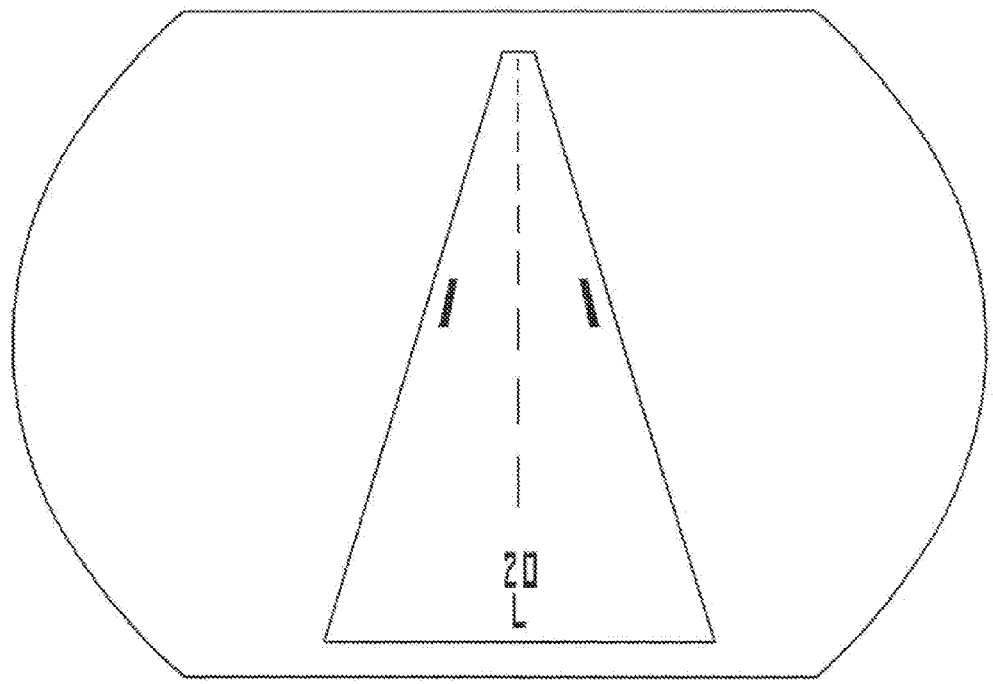
Figure 5D:
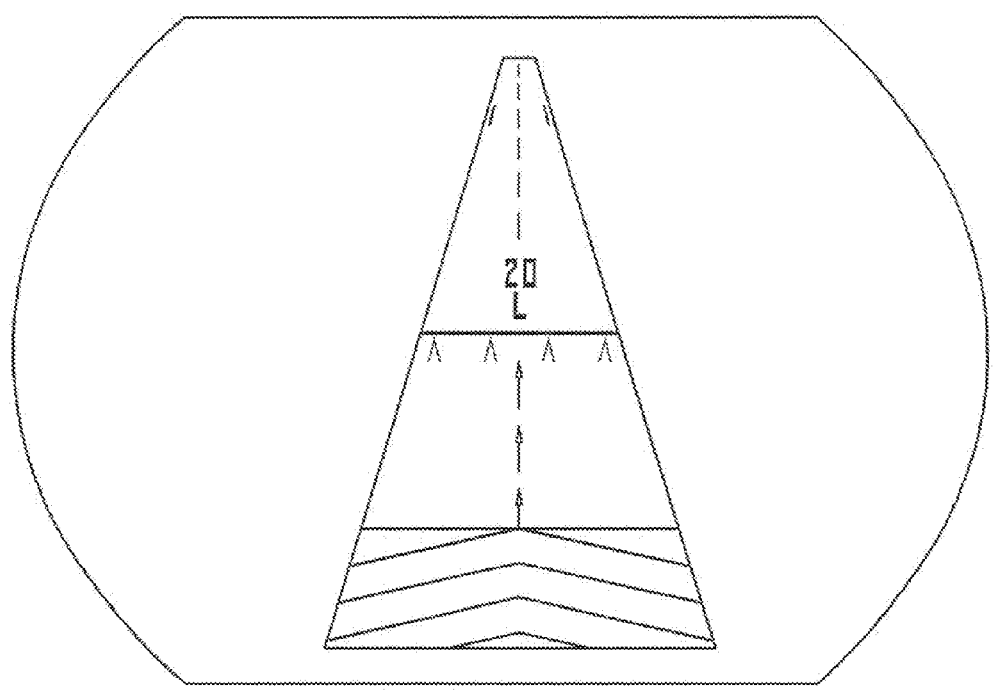

Because the indications or information shown in the drawings of FIG. 2 are well-known to those skilled in the art, a discussion of the specific tactical information shown in FIG. 2A and FIG. 2B is not provided herein. FIGS. 3A and 3B provide examples of the same images on the HUD and HDD units shown in FIGS. 2A and 2B, respectively, without the presentation of tactical information. For the sake of clarity in the remaining discussion herein, HUD units without tactical information will be presented.

The advantages and benefits of the embodiments discussed herein may be illustrated by showing examples of how situational awareness of a runway environment could be enhanced by displaying runway indicators on a display unit comprising of defined runway markings of a runway based upon a category assigned to the runway by an aviation governing authority. The drawings of FIG. 4 illustrate standards applicable for runway markings issued by the United States Federal Aviation Administration ("FAA") and found in Advisory Circular AC 150/5340-1J, an FAA Advisory Circular entitled "Standards for Airport Markings" and dated Apr. 29, 2005. The remaining discussion herein will be drawn to these FAA standards for the purpose of simplifying the discussion only; however, the embodiments are neither limited nor restricted to airports of the United States or those with governing oversight of the FAA. It is known to those skilled in the art that aviation governing authorities throughout the world may have developed standards unique to their respective jurisdictions which may or may not employ a similar marking scheme. The embodiments disclosed herein could include all runway markings standards or schemes that could be developed or employed.

The choice of runway markings employed for a specific runway could depend on a category of the runway. The categorization of a runway could be based upon the presence of an instrument approach procedure assigned to the runway. FIG. 4A illustrates the runway markings of a precision runway, FIG. 4B illustrates the markings of a non-precision runway, and FIG. 4C illustrates the markings of a visual runway. A precision runway could be a runway having an existing instrument approach procedure utilizing air navigation facilities with both horizontal and vertical guidance for which a precision approach has been approved. A non-precision runway could be a runway having an existing instrument approach procedure utilizing air navigation facilities with only horizontal guidance for which a straight-in or side-step non-precision approach procedure has been approved. A visual runway could be a runway having no straight-in instrument approach procedure.

The drawings of FIG. 4 illustrate runway markings that could displayed as a visual aid by the HUD unit 182, the HDD unit 184, or both. Runway designation markings 202, 204, and 206 could identify a runway by a number that is a whole number nearest' one-tenth of the magnetic azimuth when viewed from the direction of approach. For example, the runway designation "20" as shown would indicate the magnetic azimuth of the runway is approximately 200 degrees. Runway designation could be supplemented with a letter for parallel runways, and as shown, the runway designation "L" would indicate this surface is a left runway and that there is a separate, parallel runway "20R" to the right of it.

Runway centerline markings 208, 210, and 212 could identify the physical center of a runway and provide alignment guidance during takeoff and landing operations. Runway centerline markings 208, 210, and 212 are located along the centerline of the runway between runway designation markings and could be comprised of a line of uniformly spaced stripes and gaps. Runway threshold markings 214 and 216 could identify the beginning of a runway that is available for landing and could be comprised of eight longitudinal stripes of uniform dimensions spaced symmetrically about the runway centerline. Runway aiming point markings 218, 220, and 222 could serve as a visual aiming point for landing operations and could comprise two rectangular markings. Runway touchdown zone markings 224 (comprising items 224-A, 224-B, and 224-C) could identify the touchdown zone for landing operations and could be coded to provide distance information; runway touchdown zone markings 224 could be comprised of groups of one, two, and three rectangular bars symmetrically arranged in pairs about the runway centerline, where the number of pairs could depend upon on the length of the runway and the requirement for touchdown zone markings on the other end of the runway.

Besides runway surfaces, other non-runway surfaces may be depicted. As shown in FIG. 4D, a displaced threshold 226 is present and identified with arrows and arrowheads, and blast pad or stopway 228 could be identified with chevrons. A runway threshold bar 230 could delineate the beginning of the runway that is available for landing, and a demarcation bar 232 could delineate the boundary between a displaced threshold 226 and a blast pad or stopway 228.

For the purposes of illustration, depictions of the various visual aids comprised of runway markings and depicted on an aircraft display unit are shown in the drawings of FIG. 5. As shown in FIG. 5A, the runway markings of a precision runway are illustrated on the HUD unit 182. As shown in FIG. 5B, the runway markings of a non-precision runway are illustrated on the HUD unit 182. As shown in FIG. 5C, the runway markings of a visual runway are illustrated on the HUD unit 182. As shown in FIG. 5D, surface markings of a displaced threshold and blast pad or stopway are illustrated on the HUD unit 182.

In one embodiment of the drawings of FIG. 5, the images of conformal markings may be presented on the HUD unit 182 against the background of the actual terrain and sky located in the scene outside the aircraft. In a similar embodiment of FIG. 5, the images of markings may be presented on the HDD unit 184 against the background image of an actual and/or synthetic terrain and sky located in the scene outside the aircraft. For example, the images of actual terrain and sky may be generated in an EVS and/or combined SVS-EVS and presented on the HDD unit 184.

The drawings of FIG. 5 provide depictions of visual aids which may be presented on a display unit with a constant intensity and/or brightness level. Unfortunately, a presentation of a constant-intensity visual aid may clutter or obscure real-world physical features. Such clutter could distract and/or annoy a pilot that, in turn, could hinder the pilot's overall situational awareness. The advantages and benefits of the embodiments discussed herein may be illustrated in the drawings of FIG. 5 by showing examples of how situational awareness of a runway environment could be enhanced by disclosing a visual aid, the intensity of which varies intensity as the aircraft approaches the runway to land and/or eliminated completely from the pilot's view as the landing is performed.

The drawings of FIG. 6 depict some of the reference points and definitions that could be associated with a runway 232, where data representative of one or more of these points and definitions may be stored as waypoints in one or more reference data sources 140. As shown in FIG. 6A, a Landing Threshold Point ("LTP") 234 (which could also be called a runway threshold point) may be a three dimensional point at an intersection of the runway centerline 236 and the runway threshold ("RWT") 238; the direction of a runway centerline 236 from an LTP 234 may be measured in reference to magnetic north using a magnetic bearing. In one embodiment, an LTP 234 could be defined using latitude and longitude coordinates ("lat/long coordinates") and elevation derived from government sources. In another embodiment, a geoid height could be included in definition, where a geoid could be considered to be an equipotential surface that is everywhere normal to the direction of gravity and would coincide with the mean ocean surface of the Earth, if the oceans were in equilibrium, at rest, and extended through the continents. The surface of a geoid may be approximated using a mathematically-defined reference ellipsoid employed in a geodetic system. The height of a geoid may be measured relative to the ellipsoid, and it may be positive if it is above the reference ellipsoid and negative if it is below.

A glidepath angle ("GPA") 240 may be the angle of a specified glidepath 242 (or final approach descent path 242) to be flown by an aircraft 244 relative to an Approach Surface Base Line (not shown) at the RWT 238, where such base line may be considered as a horizontal line tangent to the Earth. A Threshold Crossing Height ("TCH") 246 may be the height of the GPA 240 above the LTP 234. A Flight Path Control Point ("FPCP") 248 may be an imaginary point above the LTP 234 at the TCH 246 from which the glidepath mathematically emanates. A Ground Point of Intercept ("GPI") 250 may be a point in the vertical plane where the final approach descent path 242 intercepts the ASBL; GPI 250 could located within a touchdown zone of a runway 232. A final approach fix 252 ("FAF") may be a point from which a final approach to the runway 232 is executed.

FIG. 6B depicts two waypoints as well as some of the other points shown in FIG. 6A, where such waypoints may be used by a manufacturer and/or end-user to determine an aircraft is on an approaching a runway on an approach phase of flight. As illustrated in FIG. 6B, the first waypoint 254 coincides with LTP 234 of FIG. 6A, and the second waypoint 256 coincides with an imaginary point below the FAF 252 of FIG. 6A. It should be noted that the selection of an LTP and an FAF to serve as references in determining the first waypoint 254 and the second waypoint 256 have been made for the purpose of illustration only and not of limitation.

FIG. 6C depicts top and profile views of an exemplary depiction of a waypoint and some of the reference points and definitions shown in FIG. 6A. As shown in FIG. 6C, the GPA 240 of the glidepath 242 equals 3 degrees, and the TCH 256 of the glidepath 242 above the LTP 234 equals 50 feet. Those skilled in the art will recognize the dimensions as the same dimensions published for a standard instrument landing system ("ILS") approach procedure. It should be noted that the embodiments herein are not restricted to an ILS approach procedure or the stated dimensions.

In the example of FIG. 6C, the manufacturer and/or end-user has defined a first waypoint 258 as an imaginary point below decision height ("DH") 260, where DH is defined as a point along the glidepath 242 at which the height of the glidepath 242 is 200 feet above the elevation of the LTP 234. Without accounting for the curvature of the Earth, the manufacturer and/or end-user has located the first waypoint 258 approximately 2,862 feet from the FTP 234 and in the opposite direction of the runway centerline.

Returning to FIG. 6B, a first waypoint 254 may be representative of the location of a reference point from which the runway 232 may be referenced, and a second waypoint 256 may be representative of the location of a reference point from which an approach to the runway 232 may be referenced, where each location may be defined using lat/long coordinates. As embodied herein, one or more reference data sources 140 may provide data representative of the first waypoint 254 and the second waypoint 256. In one embodiment herein, data representative of the first waypoint 254 and/or the second waypoint 256 may used in a function to determine whether an aircraft is operating in the approach phase of flight. In another embodiment herein, data representative of the first waypoint 254 and/or the second waypoint 256 may used in a function for varying the intensity of one or more visual aids.

The first waypoint 254 and/or the second waypoint 256 may be employed by a manufacturer and/or end-user in a plurality of configurations in determining whether an aircraft is operating in the approach phase of flight. The following configurations are provided for the purpose of illustration only and not of limitation.

In one configuration, an approach phase of flight be defined when the aircraft is a pre-defined distance (e.g., 5 nautical miles) or less to the nearest first waypoint 254, the aircraft altitude 114 is equal to or less than the elevation of the nearest first waypoint 254 location plus a pre-defined height (e.g., 1,900 feet), and the distance between the aircraft to the first waypoint 254 is decreasing, where the first waypoint 254 could correspond to a waypoint stored in a runway record, an approach record, and/or an airport location record that may be stored in one or more reference data sources 140 and provided to the IG processor 170. Waypoints such as, but not limited to, an RWT waypoint, a missed approach point fix, and/or airport lat/long reference points may be selected by a manufacturer and/or end-user as the first waypoint 254 or may be used to define another first waypoint 254 such as the DH discussed above.

In another configuration, the approach phase of flight could be defined when the aircraft is descending between the first waypoint 254 and the second waypoint 256, and the aircraft height above the surface is equal to or less than a pre-defined height. The first waypoint 254 could be one of the waypoints discussed in the preceding paragraph. The second waypoint 256 could correspond to a waypoint stored in an approach record such as, but not limited to, an initial approach fix, an intermediate approach fix, a final end point fix, a final approach fix, and/or a final approach course fix.

Even though the discussion above has been drawn to the use of waypoint(s), the use of such waypoint(s) may not be necessary for determining whether an aircraft is operating in the approach phase of flight. Approach phase of flight information may be provided from a source(s) other than a reference data source 140. For example, the active leg of a flight plan stored in an FMS may correspond to an approach. If so, data representative of the active leg may be provided to the IG processor 170 in determining whether an aircraft is operating in the approach phase of flight.

The IG processor 170 may be programmed or configured to vary the intensity of one or more visual aids as a function of the positional relationship between an aircraft and a runway, where the positional relationship could be determined using the first waypoint 254 and/or the second waypoint 256. If the visual aid is comprised of surface markings, the intensity of such visual aid could be decreased as the aircraft approaches the runway to land and/or eliminated completely from the pilot's view as the landing is performed, thereby de-cluttering the pilot's view during this critical phase of flight.

The first waypoint 254 and/or the second waypoint 256 may be employed by a manufacturer and/or end-user in a plurality of configurations in varying the intensity of a visual aid image as an aircraft operates in the approach phase of flight. The following configurations are provided for the purpose of illustration only and not of limitation.

In one configuration, the first waypoint 254 could be selected as the location at which the intensity of the visual aid is made minimal, and the second waypoint 256 could be selected as the location at which the intensity begins to vary. For the purpose of illustration, assume that the distance between the two waypoints is 5 nautical miles ("NM"), the current intensity is considered as full bright, the minimum intensity is selected to be zero, and the intensity will begin to decrease upon passing over the second waypoint 256. If the intensity is set to vary proportionally as a function of the distance between the location of the aircraft and the location of first waypoint 254, then the intensity will equal eighty percent (80%) of full bright when the aircraft is 4 NM from the first waypoint 254, sixty percent (60%) at 3 NM, forty percent (40%) at 2 NM, twenty percent (20%) at 1 NM, and zero percent (0%) at 0 NM, i.e., the first waypoint 254. As embodied herein, a decrease of intensity could be selected as a gradual variation or an incremental variation.

In another configuration, the intensity may be set to vary proportionally as a function of the distance between the location of the aircraft and the location of the second waypoint 256. If so, then the intensity will equal one-hundred percent (100%) of full bright when the aircraft is 0 NM from the second waypoint 256, eighty percent (80%) at 1 NM, sixty percent (60%) at 2 NM, forty percent (40%) at 3 NM, twenty percent (20%) at 4 NM, and zero percent intensity at 5 NM. As embodied herein, a decrease of intensity could gradually vary, where the gradual variations could be performed continuously or incrementally.

In another configuration, the intensity may be set to vary as a function of time, where the time begins when the aircraft passes over the second waypoint 256 and/or when the active leg of a flight plan stored in an FMS changes to an approach phase of flight, where data representative that the aircraft has entered an approach phase of flight may be provided by the FMS and to the IG processor 170. For the purpose of illustration, assume that the intensity will equal one-hundred percent (100%) of full bright as the aircraft enters the approach phase of flight and gradually decrease to zero percent (0%) in a period of 2 minutes. Here, it is shown that dependency of the position of the aircraft is not necessary if the FMS provides data representative that the aircraft has entered an approach phase of flight. As embodied herein, the approach phase of phase could be narrowly defined as only the final approach segment of the approach phase.

In another configuration, assume that the intensity may be set to vary proportionally as a function of the distance between the altitude of the aircraft and the elevation of the first waypoint 254, where the intensity will begin to decrease when the aircraft passes through a pre-defined altitude above the elevation of the first waypoint 254; also, assume that the pre-defined altitude is 2,000 feet. If so, then the intensity will equal one-hundred percent (100%) of full bright when the aircraft is 2,000 feet above the elevation of the first waypoint 254; eighty percent (80%) at 1,600 feet; sixty percent (60%) at 1,200 feet; forty percent (40%) at 800 feet; twenty percent (20%) at 400 feet, and zero percent intensity at zero feet. As embodied herein, a decrease of intensity could gradually vary, where the gradual variations could be performed continuously or incrementally.

In another configuration, the intensity may be set to vary once; that is, it could change from its current setting to the minimum setting without a gradual variation. For example, the intensity could change to its minimum setting when arriving at the location of one of the two waypoints or a pre-defined distance and/or time from either of them.

In another configuration in which weather data is received by the IG processor 170, the variance of the intensity may be based upon the weather data including, but not limited to, the reporting visibility and/or ceiling. For the purpose of illustration, assume that the distance between the two waypoints is 5 NM, the current intensity is considered as full bright, the minimum intensity is selected to be zero, the visibility is reported to be 2 NM, and the intensity will begin to decrease upon passing over the second waypoint 256 unless the visibility is reported to be less than 5 NM—the distance between the two waypoints. If the intensity is set to vary proportionally as a function of the distance between the location of the aircraft and the location of the first waypoint 254, then the intensity will equal one-hundred percent (100%) of full bright when the aircraft is 2 NM from the first waypoint 254, fifty percent (50%) at 1 NM, and zero percent (0%) at 0 NM, i.e., at the first waypoint 254. As embodied herein, a decrease of intensity could be selected as a gradual variation or an incremental variation.

Changing the assumptions of the preceding paragraph, assume that the distance between the two waypoints is 5 nautical miles ("NM"), the current intensity is considered as full bright, the minimum intensity is selected to be zero, the ceiling is reported to be 500 feet, and the intensity will begin to decrease upon passing over the second waypoint 256 unless the ceiling is reported to be less than 2,000 feet. If the intensity is set to vary proportionally as a function of the distance between the altitude of the aircraft and the elevation of the first waypoint 254, then the intensity will equal one-hundred percent (100%) of full bright when the aircraft is 500 feet above the elevation of the first waypoint 254, fifty percent (50%) at 250 feet and zero percent (0%) at zero feet, i.e., at the first waypoint 254. As embodied herein, a decrease of intensity could be selected as a gradual variation or an incremental variation.

As discussed throughout, the end-user has the ability to configure the intensity settings of one or more visual aids. It should be noted that, as embodied herein, this may be accomplished by the end-user through the user interface 160 as discussed above.

FIG. 7 depicts a flowchart 300 of an example of a method for generating at least one runway visual aid presented on an aircraft display unit, where the IG processor 170 may be programmed or configured with instructions corresponding to the following modules. As embodied herein, the IG processor 170 may be a processor found in the navigation data source 110, the terrain data source 130, the reference data source 140, the weather data source 150, the user interface 160, the IG processor 170, the display units 180, or any combination thereof. Also, the IG processor 170 may be a processor of a module such as, but not limited to, a printed circuit card having one or more input interfaces to facilitate data communications with the IG processor 170, i.e., the receiving and providing of data. As necessary for the accomplishment of the following modules embodied in FIG. 7, the receiving of data is synonymous and/or interchangeable with the retrieving of data, and the providing of data is synonymous and/or interchangeable with the making available or supplying of data.

The flowchart begins with module 302 with the receiving of navigation data by the IG processor 170 including data representative of the aircraft position and orientation. As embodied herein, a change in aircraft position could be used to determine the direction of a scene outside the aircraft.

The flowchart continues with module 304 with the receiving of reference data. Reference data of one or more runways located in the scene may be received from one or more reference data sources 140. In one embodiment, reference data could be provided by the taxi navigation database 142. In another embodiment, reference data could be provided by the flight navigation database 144. In another embodiment, reference data could be provided by other aircraft systems 146.

The flowchart continues with module 306 with generating of an image data set based upon the navigation data and reference data. The navigation data could be used to determine the scene outside the aircraft, and the reference data could be used to determine one or more runways located within the scene and the orientation of each runway in the scene. As embodied herein, an EMS could be a source of navigation data, reference data, or both.

The image data set could be representative of one or more visual aids that could be displayed on a display unit such as the HUD unit 182 and/or the HDD unit 184, where each visual aid could comprise an image of surface markings corresponding to one runway located in the scene outside the aircraft. As embodied herein, surface markings may be comprised of runway surface markings, non-runway surface markings, or both. In one embodiment, each visual aid may be comprised of surface markings represented in the reference data. In another embodiment, each visual aid may be comprised of surface markings derived by the IG processor 170 using the reference data. Runway markings could correspond to runway surfaces markings established by an aviation-governing authority.

In another embodiment, the intensity of one or more of the visual aids may vary, where such variance is determined as a function of the proximity of the aircraft to the corresponding runway. For example, if the aircraft is operating in the approach phase of flight, the intensity of the visual aid for that runway could be varied as the aircraft continues the approach towards the runway, where the brightness of the intensity is reduced as the aircraft approaches the runway.

In another embodiment, the variation of the intensity could be determined as a function of the first waypoint 254, the second waypoint 256, or both. As discussed above, the variation of intensity could be defined as a function of the location of the aircraft and the location of one or both of these waypoints. Additionally, the variation of intensity could be defined as a function of the altitude of the aircraft and the elevation of at least one waypoint. As embodied herein, a manufacturer and/or end-user may combine both of these functions; for instance, slant distances comprised of a horizontal component measuring the distance between two latitude and longitude locations and a vertical component measuring the distance between an altitude and elevation.

In an embodiment where the IG processor 170 receives weather information from the weather data source 150, the function for varying the intensity could include visibility and/or ceiling information corresponding to the runway. As embodied herein, weather information corresponding to the runway includes weather information reported at the airport of such runway.

In an embodiment where the IG processor 170 receives data representative of intensity configuration data from the user interface 160, the IG processor 170 may respond by ensuring the variation of intensity manifests the manual intensity configuration. In an embodiment where the IG processor 170 receives enhanced image data representative of the actual scene outside the aircraft, the basis for generating the image data set could include the enhanced image data.

The flowchart continues to module 408 with the providing of an image data set to the display units 180 including the HUD unit 182 and/or the HDD unit 184. As embodied herein, each visual aid represented in the image data set may be presented on the screen of one or more display units; that is, visual aids comprised of runway markings corresponding to one or more runways located in the scene outside the aircraft may be presented on the screen of one or more display units. In an embodiment where the intensity of one or more of visuals aids vary when the aircraft is operating in the approach phase of flight, the intensity may decrease as the aircraft approaches the runway, thereby enhancing situational awareness by de-cluttering the screen of the display unit by reducing or removing the visual aid from the pilot's view when he or she is landing the aircraft. In an embodiment where the image data set includes vision image data that could be provided by the vision image data source 130, each visual aid may be presented against a background of the scene outside the aircraft represented by synthetic image data provided by the SVS 132, enhanced image data provided by the EVS 134, or combined synthetic-enhanced image data provided by a combined SVS-EVS system. Moreover, the intensity of the scene could be varied using one or more of the embodiments disclosed above, thereby enhancing situational awareness by de-cluttering the screen of the display unit further by reducing or removing the scene from the pilot's view when he or she is landing the aircraft. Then, the flowchart proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating at least one runway visual aid presented on an aircraft display unit, said system comprising:
a source of navigation data;
a source of reference data;
an image generating processor configured to
receive navigation data representative of aircraft position and orientation,
receive reference data based upon the navigation data,
generate an image data set based upon the navigation data and the reference data, where
the image data set is representative of at least one visual aid, where
at least one visual aid is comprised of surface markings corresponding to one runway located in a scene outside the aircraft, where
an intensity of each visual aid varies as a function of a positional relationship between the aircraft and the runway, such that
the intensity of each visual aid is reduced during an approach phase of flight, and
provide the image data set to an aircraft display unit; and
the aircraft display unit configured to
receive the image data set, and
present each visual aid represented in the image data set on the aircraft display unit, where
the surface markings presented on the aircraft display unit are
increasingly less visible as the aircraft approaches the runway, and not visible when the aircraft lands on the runway, and
the aircraft display unit is comprised of a display unit other than a head-down display unit configured to display a synthetic image represented in synthetic image data.

2. The system of claim 1, wherein
a flight management computing system is
the source of navigation data,
the source of reference data, or
both.

3. The system of claim 1, wherein
the positional relationship is determined from
the latitude and longitude of the aircraft and the latitude and longitude of at least one waypoint.

4. The system of claim 1, wherein
the positional relationship is determined from
the altitude of the aircraft and the elevation of at least one waypoint.

5. The system of claim 1, wherein
the positional relationship is determined from
the latitude and longitude of the aircraft and the latitude and longitude of at least one waypoint, and
the altitude of the aircraft and the elevation of at least one waypoint.

6. The system of claim 1, further comprising:
a source of weather data, where
the image generating processor is further configured to
receive weather data representative of weather information corresponding to the runway, where
the function for varying the intensity of each visual aid includes the weather information.

7. The system of claim 1, further comprising:
a user interface configured to provide intensity configuration data, where
the image generating processor is further configured to
receive intensity configuration data representative of a manual intensity configuration, where
the function for varying the intensity of each visual aid includes the manual intensity configuration.

8. The system of claim 1, further comprising:
a source of synthetic image data, where
the image generating processor is further configured to
receive synthetic image data representative of an image comprised of three-dimensional perspective view of the scene outside the aircraft, such that
the basis for generating the image data set includes the synthetic image data, and
the aircraft display unit is comprised of a head-up display unit configured to display the image represented in the synthetic image data.

9. The system of claim 1, further comprising:
a source of first image data comprised of enhanced image data or combined synthetic-enhanced image data, where
the image generating processor is further configured to
receive first image data representative of an image comprised of a three-dimensional perspective view of the scene outside the aircraft, such that
the basis for generating the image data set includes the first image data, and
the aircraft display unit is comprised of either a head-up display unit or a head-down display unit configured to display the image represented in the first image data.

10. An apparatus for generating at least one runway visual aid presented on an aircraft display unit, such apparatus comprising:
an input communications interface;
an output communications interface; and
an image generating processor configured to
receive navigation data representative of aircraft position and orientation,
receive reference data based upon the navigation data,
generate an image data set based upon the navigation data and the reference data, where
the image data set is representative of at least one visual aid, where
at least one visual aid is comprised of surface markings corresponding to one runway located in a scene outside the aircraft, where an intensity of each visual aid varies as a function of a positional relationship between the aircraft and the runway, such that
the intensity of each visual aid is reduced during an approach phase of flight, and
provide the image data set to the output communications interface, where
each visual aid represented in the image data set is subsequently presented on an aircraft display unit, where
the surface markings presented on the aircraft display unit are
increasingly less visible as the aircraft approaches the runway, and
not visible when the aircraft lands on the runway, and
the aircraft display unit is comprised of a display unit other than a head-down display unit configured to display a synthetic image represented in synthetic image data.

11. The apparatus of claim 10, wherein
the positional relationship is determined from
the latitude and longitude of the aircraft and the latitude and longitude of at least one waypoint.

12. The apparatus of claim 10, wherein
the positional relationship is determined from
the altitude of the aircraft and the elevation of at least one waypoint.

13. The apparatus of claim 10, wherein
the positional relationship is determined from
the latitude and longitude of the aircraft and the latitude and longitude of at least one waypoint, and
the altitude of the aircraft and the elevation of at least one waypoint.

14. The apparatus of claim 10, wherein
the image generating processor is further configured to
receive weather data representative of weather information corresponding to the runway, where
the function for varying the intensity of each visual aid includes the weather information.

15. The apparatus of claim 10, wherein
the image generating processor is further configured to
receive intensity configuration data representative of a manual intensity configuration, where
the function for varying the intensity of each visual aid includes the manual intensity configuration.

16. The apparatus of claim 10, wherein
the image generating processor is further configured to
receive synthetic image data representative of an image comprised of three-dimensional perspective view of the scene outside the aircraft, such that
the basis for generating the image data set includes the synthetic image data, and
the aircraft display unit is comprised of a head-up display unit configured to display the image represented in the synthetic image data.

17. A method for generating at least one runway visual aid presented on an aircraft display unit, such method comprising:
receiving navigation data representative of aircraft position and orientation;
receiving reference data based upon the navigation data;
generating an image data set based upon the navigation data and the reference data, where
the image data set is representative of at least one visual aid, where
at least one visual aid is comprised of surface markings corresponding to one runway located in a scene outside the aircraft, where
an intensity of each visual aid varies as a function of a positional relationship between the aircraft and the runway, such that
the intensity of each visual aid is reduced during an approach phase of flight; and
providing the image data set to an aircraft display unit, where
each visual aid represented in the image data set is subsequently presented on the aircraft display unit, where
the surface markings presented on the aircraft display unit are
increasingly less visible as the aircraft approaches the runway, and
not visible when the aircraft lands on the runway, and
the aircraft display unit is comprised of a display unit other than a head-down display unit configured to display a synthetic image represented in synthetic image data.

18. The method of claim 17, wherein
the positional relationship is determined from
the latitude and longitude of the aircraft and the latitude and longitude of at least one waypoint.

19. The method of claim 17, wherein
the positional relationship is determined from
the altitude of the aircraft and the elevation of at least one waypoint.

20. The method of claim 17, wherein
the positional relationship is determined from
the latitude and longitude of the aircraft and the latitude and longitude of at least one waypoint, and
the altitude of the aircraft and the elevation of at least one waypoint.

21. The method of claim 17, further comprising:
receiving weather data representative of weather information corresponding to the runway, where
the function for varying the intensity of each visual aid includes the weather information.

22. The method of claim 17, further comprising:
receiving intensity configuration data representative of a manual intensity configuration, where
the function for varying the intensity of each visual aid includes the manual intensity configuration.

23. The method of claim 17, further comprising:
receiving synthetic image data representative of an image comprised of three-dimensional perspective view of the scene outside the aircraft, such that
the basis for generating the image data set includes the synthetic image data, and
the aircraft display unit is comprised of a head-up display unit configured to display the image represented in the synthetic image data.

* * * * *